United States Patent [19]

Gladich

[11] 4,408,684
[45] Oct. 11, 1983

[54] SEQUENCE SHIFTING COUPLING

[75] Inventor: Radisko S. Gladich, Willowbrook, Ill.

[73] Assignee: International Harvester Co., Chicago, Ill.

[21] Appl. No.: 238,387

[22] Filed: Feb. 25, 1981

[51] Int. Cl.³ ............... F16D 23/02; F16D 11/10; F16D 13/71
[52] U.S. Cl. .................. 192/53 G; 74/339; 192/53 B; 192/67 R; 192/108; 192/109 A; 192/114 R
[58] Field of Search .......... 192/53 B, 53 G, 67 R, 192/108, 109 A, 114 R, 48.91; 74/339

[56] References Cited

U.S. PATENT DOCUMENTS

| 2,152,552 | 3/1939 | Lindstrom | 192/53 G |
| 2,735,528 | 2/1956 | Dodge | 192/114 R X |
| 3,502,184 | 3/1970 | Pawlina et al. | 192/114 R X |
| 4,303,151 | 12/1981 | Kolacz | 192/114 R |
| 4,348,913 | 9/1982 | Nozawa | 192/109 A X |

Primary Examiner—Allan D. Herrmann
Attorney, Agent, or Firm—Boris Parad; F. David AuBuchon

[57] ABSTRACT

A gear clutch for selective locking engagement of the coupling element with a corresponding gear comprises a rocker reciprocably pivoting on a coupling element and movable therewith. The rocker alternately interlocks with related gears via shifting and spring means operatively interconnected therewith.

10 Claims, 3 Drawing Figures

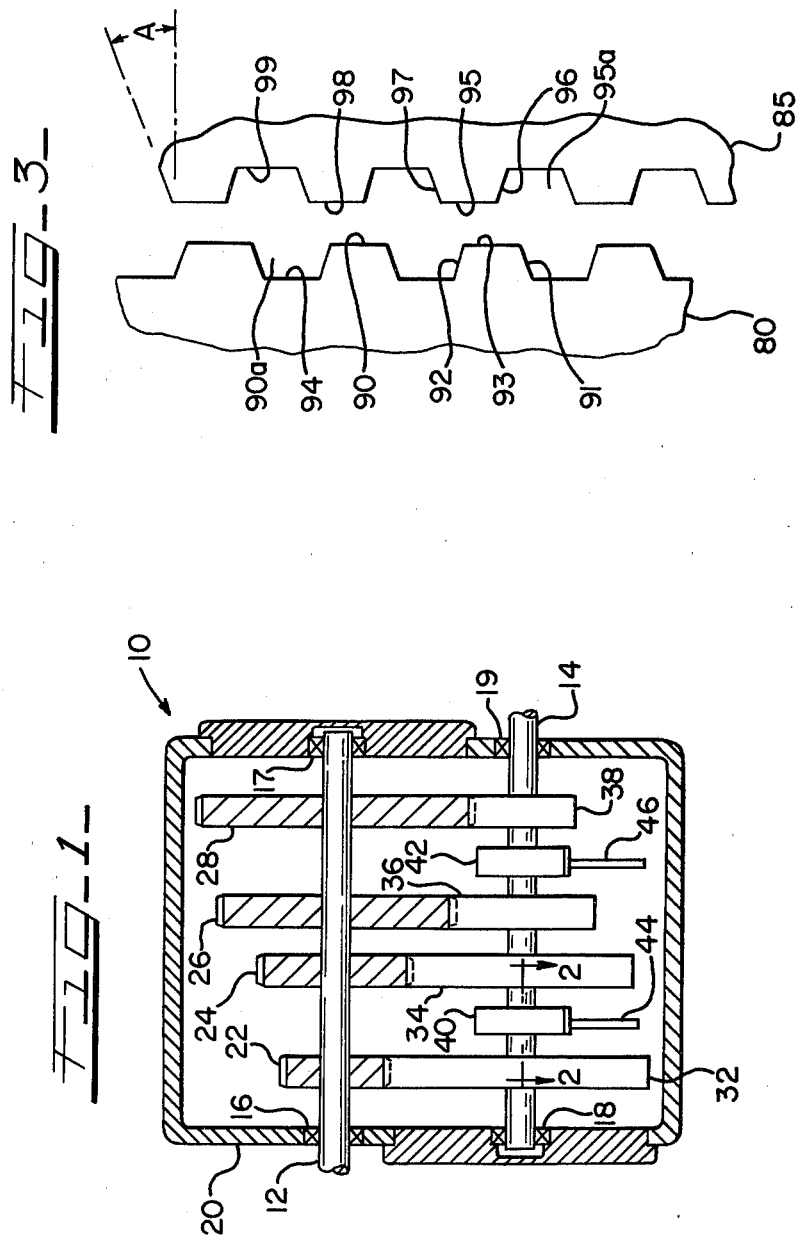

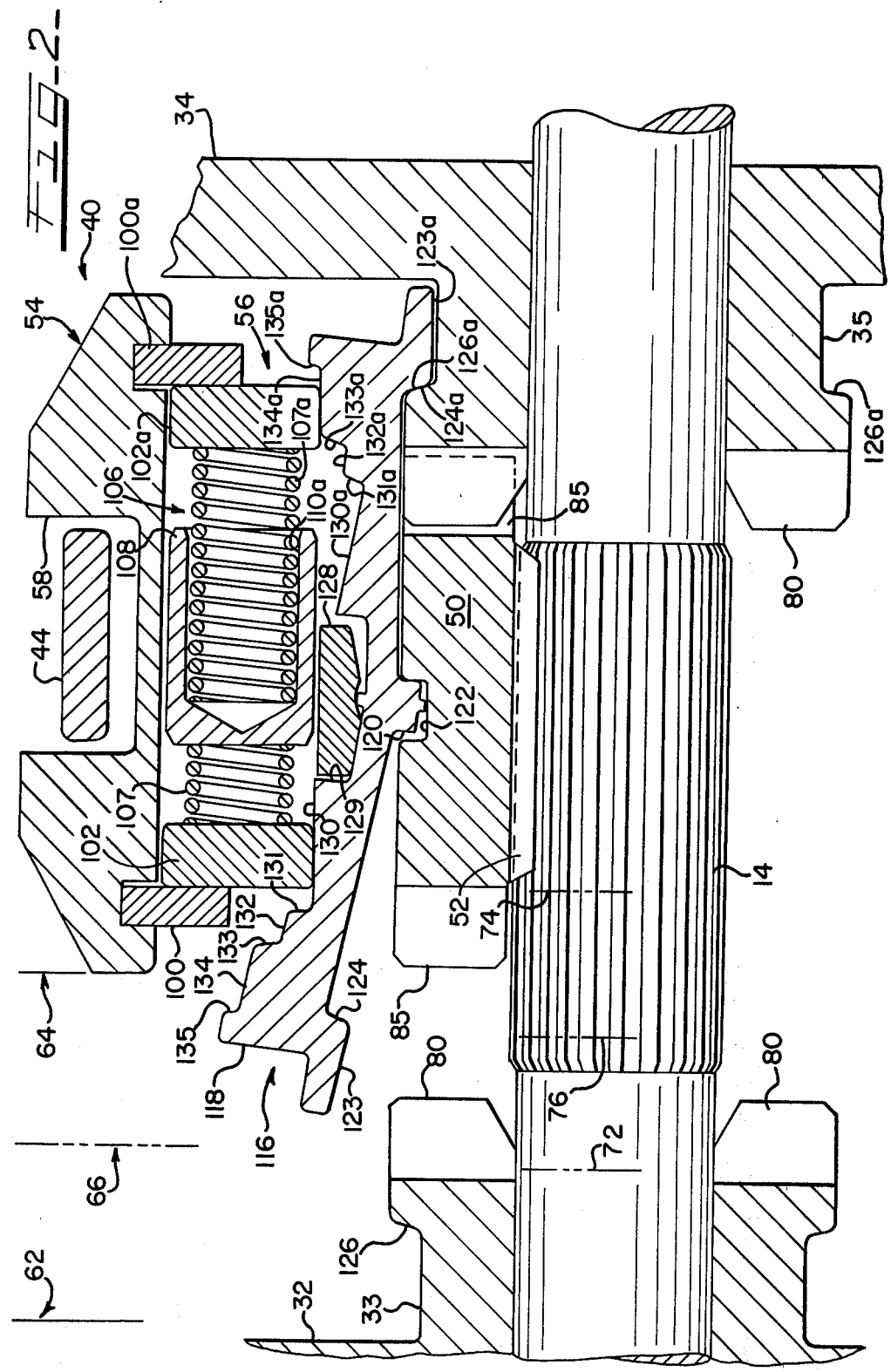

SEQUENCE SHIFTING COUPLING

BACKGROUND OF THE INVENTION

In automotive vehicles such as trucks, tractors and cars, it is common to provide a drive linkage between the vehicle engine and the drive wheels. This generally includes a line of rotating components from the rotating output of the engine to the rotating input to the drive wheels. In order to vary the ratio of speeds between the engine output and drive wheel input, a transmission device is typically used where the same can be shifted to give the operating speed or power ratios required. There further generally is a means for interrupting power transmission between the engine output and the drive wheels, and this for example takes the form of a clutch, a torque converter, or a fluid coupling.

A transmission device in its simplest form has two adjacent parallel shafts, one forming the input shaft to which power is applied and the other forming the output shaft which is ultimately connected, typically through a differential mechanism or the like, to the drive wheels. There typically would be at least two pairs of mated gears mounted respectively on the input and output shafts, where the respective pairs of gears are continuously engaged with one another. Further, one gear of each pair is keyed nonrotatably to its respective shaft while the other gear is freely rotatable on its respective shaft. Thus, although the gears are continually meshed, with nothing more, rotation of the input power shaft does nothing to cause rotation of the output shaft.

To selectively key the rotatably mounted gear then to its respective shaft, a gear clutch or synchronizer located adjacent the gear is used. In one common form of a gear clutch, a coupling member is nonrotatably keyed to, but is movable axially on the shaft, into or out of engagement with the adjacent gear. A shifting linkage is manually activated to provide this axial shifting. Cooperating teeth means on the coupling member and gear are engaged then in the drive position to key the gear via the coupling member to the shaft. With this concept, the teeth means must be synchronized before shifting can take place, and normally a main clutch is needed to accomplish this and to interrupt torque transmission through the gear set. However, inasmuch as the coupling member is moved under a positive force through direct linkage, an operator can attempt to or accidentally override or force shift the transmission to bind and/or damage teeth means if they are not in proper synchronization. Consequently, all components must be overdesigned with considerable size and bulk in order to withstand these possible idiosyncrasies of operation, which in turn adds tremendous weight and expense to the cost of the vehicle.

In a more elaborate form of a gear clutch, various means synchronize the teeth means automatically. This reduces the possibility of an operator damaging the teeth means by forcing them into engagement when they are not completely synchronized, but it adds complexity to the design. Thus, commonly a second sleeve type member is positioned between the interfaces of the coupling member and gear which has a friction type action on the freely rotating component to induce a quicker synchronization; while further which has a blocking action on the components to prevent the engagement of the teeth means until synchronization is achieved. This complicates the structure and further adds cost and an additional possible source of failure.

There further is the problem in many of these gear clutch mechanisms that all torque must be removed from the drive train before the gear clutch can be disengaged. This is in part true because the engaged coupling teeth, when under a torquing condition, generate frictional forces holding them together. Under such circumstances, it is necessary to interrupt power transmission in order to disengage one gear clutch and shift to a different drive ratio through another gear clutch.

Patents which illustrate these various forms of gear clutches are as follows: Carnagua et al. U.S. Pat. No. 2,459,360; Dodge U.S. Pat. No. 2,735,528; Pawlina et al. U.S. Pat. No. 3,333,661; Vollmer U.S. Pat. No. 3,611,832; McNamara et al. U.S. Pat. No. 3,648,546; Richards U.S. Pat. No. 3,910,131; Richards U.S. Pat. No. 3,921,469; Richards U.S. Pat. No. 3,924,484; and Richards U.S. Pat. No. 3,983,979.

SUMMARY OF THE INVENTION

This invention provides a gear clutch mechanism for selectively keying a free rotating gear mounted on a shaft to the shaft, and specifically one that can be activated frequently without using a main clutch. This invention also allows the disengagement of the gear clutch mechanism even under torquing conditions. To activate the gear clutch mechanism, a shift member or collar is moved by the operator to a fixed position corresponding to the drive or neutral condition sought. A lightweight coupling element, nonrotatably keyed to the shaft but axially movable relative thereto, is coupled to this shift member by a resilient linkage means. The coupling element is thus biased toward a corresponding drive or neutral position. In the corresponding drive position, cooperating teeth means on the coupling element and gear are engaged to key the gear to the shaft, via the coupling element; whereas in the neutral position, these teeth means are completely disengaged. The teeth means are preferably of the positive rejection type, which means that under a torquing condition, a rejection force is generated tending to separate them. The resilient linkage means has a light biasing force, so that even if the teeth means are not in synchronization while the coupling element is being shifted toward the gear, the teeth means merely clash to reject the coupling element away from the gear against the bias of the linkage means. This bias toward reject away action on the coupling element continues until the teeth means reach sufficient synchronization to allow lock means to be set to hold the coupling element in the drive position, overcoming then the rejection forces.

The invention in its broad principle provides a gear clutch mechanism having mechanical logic based on a proper combination of (1) mass of the movable parts of the mechanism, (2) the strength of the spring means of the mechanism, and (3) the shapes of the teeth of the gear clutch mechanism's coupling element as they relate to and interfere with the teeth of the gears to be engaged. The tooth shape and spring force are determined so that the clutch mechanism is selective to lock at a predetermined speed.

BRIEF DESCRIPTION OF THE DRAWINGS

FIG. 1 is a schematic sectional view of a transmission device incorporating a preferred embodiment of the subject invention;

FIG. 2 is an enlarged view of the gear clutch mechanism described herein as taken from line 2—2 in FIG. 1; and FIG. 3 is a development view of a preferred form of cooperating teeth means used in the gear clutch mechanism disclosed herein.

DETAILED DESCRIPTION OF THE INVENTION

A manual transmission 10 is illustrated in FIG. 1 in a semischematic fashion. The transmission 10 has an input shaft 12 adapted to be coupled by any of various means to an engine output shaft (not shown), and an output shaft 14 adatped to be coupled by any of various means to the vehicle drive wheels (not shown). The shafts are journalled at their ends by appropriate bearing means 16, 17, 18 and 19 supported in a transmission casing 20 and are shown in parallel side-by-side relationship. The transmission casing 20 also serves to retain a liquid lubricant, as is well known in the art.

The transmission illustrated is a four speed box, and for purposes of illustration there are contained on the input shaft four pinion gears 22, 24, 26 and 28. Each of these gears are keyed or otherwise secured to the input shaft so as to rotate continuously therewith. The output shaft has four gears 32, 34, 36 and 38 each of which, respectively, is journalled by appropriate bearing means (not shown) to rotate freely on the shaft 14. The gears 32, 34, 36 and 38 are, however, axially fixed on the shaft 14, so that the gear pairs 22 and 32, 24 and 34, 26 and 36, 28 and 38 are each continuously engaged and meshed together.

As the drawing clearly shows, pinion 22 is the smallest of gears 22, 24, 26 and 28 and when operating through its mating gear 32 tends to produce the highest torque and lowest speed of the output shaft 14 relative to a constant speed provided on the input shaft 12. Thus gears 22 and 32 provide the first speed ratio. Likewise, the engaged gear pair 24 and 34 represents a second speed ratio, gear pin 26 and 36 a third speed ratio and engaged gear pair 28 and 38 represent the fourth and highest speed ratio. As is well known, the lower speed ratios would be used for high torque situations while the higher speed ratio would be used for low torque, high speed situations.

Inasmuch as the subject can be disclosed with this hypothetical transmission box as shown, no reverse gear or gears has been illustrated, although the same would be incorporated in an actual transmission using the subject invention.

Located on the output shaft 14 and generally between the gears 32 and 34 is a first and second speed ratio gear clutch mechanism 40, and located on the output shaft 14 between the gears 36 and 38 is a third and fourth speed ratio gear clutch mechanism 42. Each of the gear clutch mechanisms is generally similar one to the other. The gear clutch mechanisms 40 and 42 are used to individually and selectively key the gears 32, 34, 36 and 38 to the shaft 14 to provide a drive connection between the shafts 12 and 14; gear clutch mechanism 40 operating to connect either gear 32 or 34 to the shaft 14 and gear clutch mechanism 42 operating to connect either gear 36 or 38 to the shaft.

There is also associated with a transmission of the type illustrated herein a manual shift lever (not shown) which can be manipulated manually be the operator of the vehicle to select which of the speed ratios are engaged. Shifting forks illustrated at 44 and 46, are associated with each gear clutch mechanism 40 and 42 respectively, and are manipulated via the shift lever by the operator to move the gear clutch mechanisms axially of the shaft and thereby cause speed ratio shifting to occur. While the construction of the shift lever and shifting forks may be conventional, and accordingly are illustrated herein only schematically or not all, it is possible to make these components of lighter construction because the forces encountered during shifting are smaller.

FIG. 2 illustrates in greater detail a typical gear clutch mechanism, either 40 or 42, although the section is shown as taken through mechanism 40. The mechanism has a coupling element 50 mounted on the shaft 14 adapted to move axially of the shaft between the adjacent gears. Cooperating spline construction 52 nonrotatably keys the coupling element 50 to the shaft. Annular shift collar member 54 surrounds the coupling element 50 in spaced relation, but is interconnected thereto by means of appropriate shifting linkage means 56. The collar has a groove 58 therein suitable to receive and axially restrain the specific operating shift fork, 44 as illustrated. The shift collar 54 can thus be moved axially of the shaft by the fork linkage between two extreme drive positions (illustrated by the shift in edge line as at 62 and 64), and an intermediate neutral position as at 66. At these various positions, the shifting linkage means 56 causes the coupling element 50 to be moved correspondingly between two respective drive positions 72, 74 corresponding to the drive positions 62 and 64 respectively and to a neutral position 76.

The adjacent side faces of the gears 32, 34, 36 and 38 respectively are formed with projecting hubs 33 and 35, each hub having teeth means 80. Disposed also on the coupling element 50 are mating teeth means 85. The teeth means 80 and 85 are illustrated in a developed fashion in FIG. 3, where it can be seen that each is comprised of a plurality of individual separate tooth components 90 and 95 separated by valley spaces 90a and 95a defined specifically by tapered drive faces 91 and 92 (96, 97) interconnected at the outer edges by land faces 93 (98) and at the inner edges by valley faces 94 (99). The drive faces 91 and 92 (96, 97) are disposed generally radially of the axis of the shaft, and further the teeth means 90 and 95 are open toward one another. Consequently, axial movement of the coupling element relative to the shaft toward either of the gears engages the teeth means of the coupling element and gear together, initially with only slight penetration of the mating teeth and with progressively greater penetration until the coupling element is almost against the gear and gear teeth means are completely engaged.

When the teeth 80 and 85 are engaged and under a torquing condition, at least one corresponding set of drive faces (92 and 96, or 91 and 97) are engaged. In a preferred embodiment, the drive faces are arranged at an angle A relative to the longitudinal enter axis of the shaft, where the tangent of the angle A is comparable to or larger than the coefficient of friction between the engaged drive faces. Consequently under a torquing condition, the engaged teeth means 80 and 85 develop a force tending to move the coupling element 50 axially of the shaft 14 and away from the gear 32 or 34 in such a manner so as to disengage the teeth means, and this is called a positive rejection force.

A pair of snap rings 100 (100a) are trapped axially in a recess in the shifting collar 54, and a pair of locking rings 102 (102a) are disposed inwardly of the snap rings with radial clearance from the inner face of the collar 54. The resilient linkage means 56 is comprised of several individual coil springs 107 (107a) and an annular spring retainer ring 108 carried medially of the separate springs 107 (107a). In the embodiment illustrated, the spring retainer ring 108 has a smooth exterior, cylindrical, face spaced radially from the inner face of the shift collar 54 so as to be movable relative thereto; and further has pockets 110a formed at equal intervals circumferentially spaced around the ring and open in alternatingly opposite directions. Each pocket forms a seat against which the end of each individual spring 107 (107a) can be positioned, while the opposite spring end butts against a corresponding locking ring 102 (102a). With this configuration, the locking rings 102 (102a) are biased against the snap rings 100 (100a) by the compression springs 107 (107a).

Located outwardly of the coupling element 50 at three or more equally spaced locations around the periphery of the coupling element are locking clamps 116. Each locking clamp 116 is in the form of a rocker element 118 having a center pivot 120 received within recess 122 on the coupling element 50 so as to be axially restrained relative thereto. Each rocker element 118 further has opposite end faces 123 (123a) which overlap part of the adjacent gear when that gear and coupling are engaged in the drive position, and each end presents a tab 124 (124a) that can be positioned behind a shoulder 126 (126a) formed on the hub 33 (35) to interlock therewith. This thereby precludes separation of the engaged teeth means 80 and 85 and maintains the respective gear and coupling element 50 in the drive position. A circular retainer ring 128 fitted in a groove 129 in the spaced locking clamps 116 prevents separation of the locking clamps from their pivotal and axial fixed connection relative to the coupling element.

The rocker element 118 has along its face adjacent the spring means 106 a series of stepped riser and tread areas 130 (130a), 131 (131a), 132 (132a), 133 (133a), 134 (134a) and 135 (135a). The locking rings 102 (102a) ride against the tread areas 130 (130a), 132 (132a) and 134 (134a) in respective operative positions of the rocker element 118, and further the spring means in certain shift conditions causes the locking rings to be biased against the riser areas 131 (131a), 133 (133a) and possibly 135 (135a).

Specifically illustrated in FIG. 2, the locking ring 102a is butted against the tread area 134a while the locking ring 102 is disposed against the tread area 130. In this configuration, the rocker element is held stably in this locking position and cannot be rotated from this position to any other position until the shift collar 54 is moved axially to the left.

In the design of the subject invention, it is contemplated that the coupling element 50 have a low mass ($\frac{1}{2}$ to 2 pounds) so that only a slight spring force (5 to 15 pounds) created by the spring means will be needed to shift it. Also, the low mass allows rapid acceleration of the coupling means toward and away from the gear. During the shifting, the initial differential in the speeds between the coupling element and/or shaft, and the adjacent gear to which the transmission is to be shifted can be quite high of the order of several hundred r.p.m. Upon the initial attempted engagement of the gears, the outer land areas 93 and 98 on the cooperating teeth interfere with one another and allow at most only a slight penetration of the teeth 90 and 95 into the corresponding valley 90a and 95a, as the land areas slip off one another and the teeth line up opposite the adjacent valley. Because the coupling element shifting force is small and is resilient via spring means 56, even though the teeth means clash, the impact is not damaging. The end result is merely that the coupling element 50 is thrust axially away from the gear element and the action of attempted engagement is then repeated automatically, assuming the shift collar remains stationary axially. As the speed differential drops, deeper and deeper penetration of the teeth into the opposite valleys is allowed until the speed differential approaches designed locking speed difference.

For example, with the coupling element having a mass of approximately $1\frac{1}{2}$ lbs. and the spring means 56 being calibrated to produce a force of approximately 10 lbs., at a speed differential of the order of 200 r.p.m., there might be only approximately a 10% penetration of the tooth profile 90 and 95 into the opposite valley 90a and 95a. This penetration increases to almost 50% at a speed differential of the order of 100 r.p.m.; and when the speed differential approaches 75 r.p.m., for example, there is nearly 90% penetration of the teeth means. At this time, viz 90% penetration, the tab sections 124 or 124a of the locking elements slip past the corresponding adjacent gear shoulders 126 or 126a to interlock the gear and coupling element. Prior to this full engagement of the teeth means, with penetration even up to maybe 75% for example, the penetration of the teeth means is only temporary and the torquing condition tends to separate the teeth means with a positive rejection force by shifting the coupling element 50 axially of the shaft.

In a preferred embodiment, the spring force need only be approximately 1% of the positive rejection force. Viewed in another manner, the spring force is only slightly greater than the mass of the coupling element.

OPERATION OF THE INVENTION

The transmission would normally be operatively connected in the drive train of a motor vehicle, like a truck for example. The operator would use a separate main clutch (not shown) to engage the transmission initially in the first speed ratio and get the vehicle rolling. Thereafter the main clutch need not be used until the vehicle is to be stopped again. However, under certain circumstances, such as with a fluid coupling in the drive train or with an extremely high ratio first speed drive, the transmission could possibly be shifted into drive without using the main clutch.

Assume then that the vehicle is to be shifted to the first speed ratio where gears 22 and 32 are to be engaged. To engage the gears, shift collar 56 of mechanism 40 is shifted to the leftmost drive position 62, which spring biases the locking ring 102 against the riser 133 and which forces locking ring 102a off tread area 130a. This shifts the coupling element 50 to the left against the hub 33 of gear 32 and creates a moment on the rocker 118 about the pivotal connection 120, 122 until restrained by abutment of the land surface 123 against the upper side of the hub 33 of gear 32. The teeth means 80 and 85 may or may not mesh, depending upon their synchronization and position, although the spring linkage means 56 nonetheless biases the coupling element 50 against the adjacent gear with only a small force. As noted in the profile of the teeth means in FIG. 3, the land areas 93 and 98 on the teeth means interfere or ride along one another, although some penetration of each tooth 90 and 95 respectively into the opposite valley 95a and 90a would likely occur momentarily. In normal operation and in using a main clutch (not shown), the required synchronization of speeds of the gear 32 and the shaft 14 would quickly occur to allow 90% penetration of the teeth means. The locking rocker element tab 124 would thus clear the shoulder 126 and upon the locking element rotating counter-clockwise (FIG. 2) would interlock the coupling element 50 and the gear 32 together. The locking ring 102 would further ride up the riser 133 to seat against tread area 134, which holds the rocker element 118 in this lock position.

It is noted that gear clutch mechanisms 40 and 42 are disposed between the first and second gear ratios and between the third and fourth gear ratios. Consequently, the relative speeds of each pair of gears for either gear clutch mechanism is closely related so that reaching synchronization for shifting is rather easily and quickly reached.

Consider then upshifting from the first speed ratio to the second speed ratio, prior to the disengagement of gear 32 from the shaft 14 the gear 34 would be free rotating on the shaft 14 at a faster speed than the shaft. The operator would reduce the speed of the engine and simultaneously activate the shift mechanism to cause the shift collar to be shifted to the second speed ratio drive position 64. This shifts the locking ring 102 off tread area 134 down to tread area 130, and biases the locking ring 102a initially against riser 131a and allows a clockwise rocking of the rocker element 118 until land area 123a is against the upper face of the hub 35 of gear 34. The locking ring 102a also then can ride up the inclined riser 131a and become seated initially against riser 133a. The teeth means 80 and 85 of course abut one another under the bias of the spring linkage means 56, and the second speed gear 34 would decelerate quickly while the shaft 14 would continue to rotate because of the continued movement of the vehicle. Very quickly then, the natural synchronization of the gear 34 and shaft 14 will occur, at which time the actual shifting will take place. The rocker element 118 then is further rotated clockwise to have the tab 124a pass shoulder 126a, and locking ring 102(a) rides up riser 133a to tread area 134a. This holds the transmission in the second speed ratio drive position.

The entire shift period with properly experienced drivers requires only a few milliseconds, particularly since the subject shift mechanism need not have 100% synchronization in order to fully engage the teeth. When the coupling teeth means are fully engaged and the locking means set, the operator accelerates the engine and continues on with the normal mode of driving.

When it is time to shift between the second speed ratio and the third speed ratio, the gear clutch mechanism 40 must be disengaged while simultaneously the gear synchronizer mechanism 42 must be engaged to bring into play the third speed ratio gears 26 and 36. This simultaneous actuation of the gear clutch mechanisms is accomplished by properly adjusted fork linkage means (not shown) as is well known in the art.

For downshifting from one speed ratio to a lower speed ratio, it might be necessary to accelerate the engine and/or to brake the vehicle in order to allow the gear clutch mechanism teeth means to be brought into closer synchronization.

Even when the gears are under a torquing condition, it is very easy to disengage the coupling teeth means merely by moving the shift collar member 54 to the neutral position 66, and this can be done with a very slight force only slightly greater than the compression of the springs in shifting linkage means 56. Under such a displacement to the neutral or to the opposite drive position of the shift collar, the compressed spring means initially removes the locking means clamps from engagement with the gear, as above noticed, and then biases the coupling element 50 away from the engaged gear. The torquing condition between the teeth means also creates a positive rejection force on the teeth means to displace the coupling element axially, unlocking the locking means and disengaging the clutched gear from the shaft 14.

In the neutral position of the rocker element 118, its upper tread areas 130 and 130a are generally parallel to the upper profile of the coupling element 50. These surfaces (132 and 132a) are actually locating the outer part of the coupling through the locking rings. The locking tabs 124 (124a) and tread areas 123 (123a) are separated from both adjacent gears. The coupling element 50 thereby is free to axially shift out of its drive position to its neutral position where both sets of cooperating teeth means are separated and the gears rotate freely on the shaft 14.

The particular gear clutch mechanism is quite simple in construction, having the moving coupling element 50, a number of rocker elements 118 and a retainer ring 128 for the same, and a shifting linkage mechanism 56 fitted between the shift collar 54 and coupling element. This spring-lock arrangement also transmits the shift of the collar 54 to the rocker element 118, while it automatically shifts the clamps out of the locking positions to the neutral position, or automatically from the neutral position to the locking position upon the proper synchronization of the coupling teeth means. The positive rejection force created between the gear clutch teeth means themselves cause the disengagement of the drive, even under torquing conditions. This thereby allows the shift lever (not shown) to be of low load carrying size and strength.

ALTERNATE EMBODIMENTS OF THE INVENTION

While the teeth means 80 and 85 of the coupling and gear are preferably the positive rejection type, they need not be. Thus, if the tangent of ange A (FIG. 3) on the tooth configuration were only comparable to or less than the coefficient of friction between the engaged drive faces 92 and 96 or 93 and 98, the gears will not become disengaged as readily. However, the bias of spring means 56 will disengage the teeth means upon the interruption of torque in the drive train, which is possible again without the need of a main clutch (not shown) but only with proper driving techniques and natural synchronizing of the gear clutch teeth means. Also, the rocker element 118 may be modified to the extent to interlock with a shoulder means formed on the shaft 14, rather than either of the gear shoulders 126 (126a), when it is intended to hold the coupling element and gear coupled together.

What is claimed is:

1. An improved clutch means having movable parts including a coupling element aggregated together for selectively engaging a gear on a rotatable shaft, said clutch means incorporating mechanical logic determinative for selective operation comprising a fixed mass value of said movable parts;

spring means having a biasing force capability related to and depending on a plurality of variables including said fixed mass value of said movable parts; and teeth means on said coupling element having tooth shapes relating to and depending on a plurality of variables including said fixed mass value of said movable parts and said spring means biasing force;

said fixed mass value is the mass of said improved clutch means including said coupling element and said spring means; and a rocker pivotably mounted on said coupling element and lockingly engageable with said gear for conjoint rotation of said coupling element with said gear.

2. In combination with a shaft and a gear mounted rotatably on the shaft, improved clutch means for selectively keying the gear nonrotatably to the shaft for releasing same, comprising:

a coupling element mounted to slide axially while being keyed nonrotatably relative to the shaft;

teeth means on the coupling element and on the gear projecting toward each other axially of the shaft so that axial movement of the coupling element toward the gear causes the teeth means to cooperate together and progressively penetrates the teeth means together;

means for shifting the coupling element axially of the shaft between firstly a drive position whereat the cooperating teeth means are completely engaged to key the gear via the coupling element nonrotatably relative to the shaft and secondly a neutral position whereat the cooperating teeth means are completely disengaged;

said shifting means including a shift member that is moved between drive and neutral positions and spring means acting between the coupling element and the shift member operable when the shift member is in its drive position to bias the coupling element towards its drive position, said spring means being calibrated to create a small biasing force greater than the mass of the coupling element but sufficient to cause the coupling element to transfer axially of the shaft to its drive position when the teeth means are in substantial synchronization;

locking means movable between lock and neutral positions and operable in the lock position to cooperate with the gear and retain the coupling element in its drive position and operable in the neutral position to release the coupling element;

said locking means comprising a rocker operatively connected with said shifting and spring means;

said rocker reciprocably rotatable about said coupling element and moveable along said shaft by said shift member and said spring means for selective interlocking engagement of said rocker with said gear.

3. A gear clutch combination according to claim 2, wherein said teeth means are comprised of separate teeth components each having a drive face disposed at an angle relative to the longitudinal axis of the shaft where the tangent of the angle is comparable to the coefficient of friction between the engaged drive faces, thereby creating under torquing conditions a positive rejection force on the coupling element axially of the shaft away from the gear that tends to disengage the cooperating teeth means.

4. A gear clutch combination according to claim 3, wherein said spring means are further calibrated to create a biasing force on the coupling element of the order of approximately only 1% of the positive rejection force tending to move the coupling element axially of the shaft.

5. In combination with a shaft and a pair of gears each mounted rotatably on the shaft, improved clutch means for selectively keying either of the gears nonrotatably to the shaft and for releasing same, even under torquing conditions, comprising:

a coupling element mounted on the shaft between but spaced from the gears operable to slide axially of the shaft separately against either gear while being keyed nonrotatably relative to the shaft;

teeth means on each of the gears projecting axially of the shaft toward the other and teeth means on opposite sides of the coupling element adjacent the respective gear, so that axial movement of the coupling element toward either gear causes the teeth means of that respective gear and coupling element to cooperate together and progressively penetrates the teeth means together;

said teeth means being comprised of separate teeth components each having a drive face disposed at an angle relative to the longitudinal axis of the shaft where the tangent of the angle is comparable to or greater than the coefficient of friction between the engaged drive faces, thereby creating under torquing conditions a positive rejection force on the coupling element axially of the shaft away from the gear tending to disengage the cooperating teeth means;

means for shifting the coupling element axially of the shaft firstly between either of two drive positions whereat the cooperating teeth means of the coupling element and either respective gear are completely engaged to key that gear via the coupling element nonrotatably relative to the shaft and secondly a neutral intermediate position whereat the cooperating teeth means are completely disengaged;

said shifting means including a shift member that is moved between two opposite drive positions and an intermediate neutral position and spring means acting alternately against either gear while being keyed nonrotatably relative to the shaft;

teeth means on each of the gears projecting axially of the shaft toward the other and teeth means on opposite sides of the coupling element adjacent the respective gear, so that axial movement of the coupling element toward either gear causes the teeth means of that respective gear and coupling element to cooperate together and progressively penetrates the teeth means together;

said teeth means being comprised of separate teeth components each having a drive face disposed at an angle relative to the longitudinal axis of the shaft where the tangent of the angle is comparable to or greater than the coefficient of friction between the engaged drive faces, thereby creating under torquing conditions a positive rejection force on the coupling element axially of the shaft away from the gear tending to disengage the cooperating teeth means;

means for shifting the coupling element axially of the shaft firstly between either of two drive positions whereat the cooperating teeth means of the coupling element and either respective gear are completely engaged to key that gear via the coupling element nonrotatably relative to the shaft and secondly a neutral intermediate position whereat the cooperating teeth means are completely disengaged;

said shifting means including a shift member that is moved between two opposite drive positions and an intermediate neutral position and spring means acting between the coupling element and the shift member operable when the shift member is in either of its drive positions to bias the coupling element towards its corresponding respective drive position, said spring means being calibrated to create a biasing force only slightly greater than the mass of the coupling element and significantly less than the maximum positive rejection force, operable nonetheless to cause the coupling element to transfer to its drive position when the teeth means are in substantial synchronization;

locking means movable between two corresponding respective lock positions and an intermediate neutral position, and operable in either of said lock positions to cooperate with the respective gear and retain the coupling element in its drive position with said gear, and operable in the neutral position to release the coupling element to its neutral position; and said locking means comprising a rocker pivoting on said coupling element and moveable therewith for gradual locking engagement and disengagement of said rocker with one of said gears.

6. A gear clutch combination according to claim 5, wherein said locking means is disposed between the spring means and the coupling element and serves not only to transmit the shifting force to the coupling element but further to be shifted to its lock position automatically upon the coupling element being shifted to its drive position.

7. A gear clutch combination according to claim 5, wherein said rocker pivotably mounted on the coupling element and having its remote ends designed to lap beyond said teeth means of each gear and interlock with a portion of the corresponding gear, adapted to receive one of said ends, to retain the coupling element in its drive position.

8. In combination with a shaft and a pair of gears each mounted rotatably on the shaft, improved clutch means for selectively keying either of the gears nonrotatably to the shaft and for releasing same, even under torquing conditions, comprising:

a coupling element mounted on the shaft between but spaced from the gears operable to slide axially of the shaft separately against either gear while being keyed nonrotatably relative to the shaft;

teeth means on each of the gears projecting axially of the shaft toward the other and teeth means on opposite sides of the coupling element adjacent the respective gear, so that axial movement of the coupling element toward either gear causes the teeth means of that respective gear and coupling element to cooperate together and progressively penetrates the teeth means together;

said teeth means being comprised of separate teeth components each having a drive face disposed at an angle relative to the longitudinal axis of the shaft where the tangent of the angle is comparable to or greater than the coefficient of friction between the engaged drive faces, thereby creating under torquing conditions a positive rejection force on the coupling element axially of the shaft away from the gear tending to disengage the cooperating teeth means;

means for shifting the coupling element axially of the shaft firstly between either of two drive positions whereat the cooperating teeth means of the coupling element and either respective gear are completely engaged to key that gear via the coupling element nonrotatably relative to the shaft and secondly a neutral intermediate position whereat the cooperating teeth means are completely disengaged;

said shifting means including a shift member that is moved between two opposite drive positions and an intermediate neutral position and spring means acting shaft separately against either gear while being keyed nonrotatably relative to the shaft;

teeth means on each of the gears projecting axially of the shaft toward the other and teeth means on opposite sides of the coupling element adjacent the respective gear, so that axial movement of the coupling element toward either gear causes the teeth means of that respective gear and coupling element to cooperate together and progressively penetrates the teeth means together;

said teeth means being comprised of separate teeth components each having a drive face disposed at an angle relative to the longitudinal axis of the shaft where the tangent of the angle is comparable to or greater than the coefficient of friction between the engaged drive faces, thereby creating under torquing conditions a positive rejection force on the coupling element axially of the shaft away from the gear tending to disengage the cooperating teeth means;

means for shifting the coupling element axially of the shaft firstly between either of two drive positions whereat the cooperating teeth means of the coupling element and either respective gear are completely engaged to key that gear via the coupling element nonrotatably relative to the shaft and secondly a neutral intermediate position whereat the cooperating teeth means are completely disengaged;

said shifting means including a shift member that is moved between two opposite drive positions and an intermediate neutral position and spring means acting between the coupling element and the shift member operable when the shift member is in either of its drive positions to bias the coupling element towards its corresponding respective drive position, said spring means being calibrated to create a biasing force only slightly greater than the mass of the coupling element and significantly less than the maximum positive rejection force, operable nonetheless to cause the coupling element to transfer to its drive position when the teeth means are in substantial synchronization;

locking means movable between two corresponding respective lock positions and an intermediate neutral position, and operable in either of said lock positions to cooperate with the respective gear and retain the coupling element in its drive position with said gear, and operable in the neutral position to release the coupling element to its neutral position;

wherein said locking means is disposed between the spring means and the coupling element and serves not only to transmit the shifting force to the coupling element but further to be shifted to its lock position automatically upon the coupling element being shifted to its drive position;

wherein said locking means is in the form of a rocker pivotably cooperating with the coupling element and having a remote end designed in the lock position to lap beyond and interlock with a portion of the gear operable to retain the coupling element in its drive position.

9. A gear clutch combination according to claim 8, wherein said rocker further has adjacent shoulder and land areas remote from the pivotal cooperation of the rocker with the coupling element, said shoulder areas being designed to carry the bias force of the spring means, and whereby the spring means automatically not only shifts said rocker between its lock and neutral positions as the coupling element is shifted between its drive and neutral positions, respectively, but also shifts its cooperation with the respective shoulder areas of the rocker.

10. A gear clutch combination according to claim 9, wherein said locking means further includes a rigid lock member that is biased by the spring means selectively against specific land areas of the rocker when the rocker is in its respective lock and neutral positions, operable to hold the rocker in such respective positions.

* * * * *